(12) United States Patent
Chu et al.

(10) Patent No.: US 10,764,235 B2
(45) Date of Patent: Sep. 1, 2020

(54) METHOD AND SYSTEM FOR NETWORK ACCESS DISCOVERY (71) Applicants: Xingjun Chu, Ottawa (CA); Guoli Yin, Ottawa (CA)

(72) Inventors: Xingjun Chu, Ottawa (CA); Guoli Yin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 15/927,618

(22) Filed: Mar. 21, 2018

(65) Prior Publication Data

US 2019/0297050 A1 Sep. 26, 2019

(51) Int. Cl.
*H04L 29/12* (2006.01)
*H04L 12/721* (2013.01)

(52) U.S. Cl.
CPC ............ *H04L 61/103* (2013.01); *H04L 45/66* (2013.01); *H04L 61/10* (2013.01)

(58) Field of Classification Search
CPC ........ H04L 61/103; H04L 45/66; H04L 61/10
USPC .................................................. 370/392, 390
See application file for complete search history.

(56) References Cited

U.S. PATENT DOCUMENTS

| 8,804,720 B1* | 8/2014 | Rainovic | H04L 12/185 370/390 |
| 10,243,651 B1* | 3/2019 | Le | H04B 7/18528 |
| 2005/0058131 A1* | 3/2005 | Samuels | H04L 41/00 370/389 |
| 2013/0262924 A1* | 10/2013 | Ogihara | G06F 11/1088 714/15 |
| 2013/0294291 A1* | 11/2013 | Rasanen | H04L 12/1407 370/259 |
| 2016/0006746 A1* | 1/2016 | Sheth | H04L 63/0876 726/4 |
| 2016/0380893 A1* | 12/2016 | Chopra | H04L 45/74 370/392 |
| 2017/0048143 A1* | 2/2017 | Roy | H04L 69/22 |

(Continued)

FOREIGN PATENT DOCUMENTS

| CN | 102664788 A | 9/2012 |
| CN | 105939266 A | 9/2016 |
| CN | 107332773 A | 11/2017 |

OTHER PUBLICATIONS

Proxy ARP, Cisco Systems, Inc., Jan. 28, 2008.

*Primary Examiner* — Rownak Islam (57) ABSTRACT

Aspects of the disclosure provide a system and method used for receiving Address Resolution Protocol (ARP) requests from access nodes and returning a designated address to satisfy a service provider' policies. This can include receiving a request from an access node at a provider edge node, and returning a designated Media Access Control (MAC) address in response to a request for a MAC address for a specified destination IP address, the designated MAC address being a MAC address for a node other than the provider edge node. This can effectively route requests to a Policy Enforcement point (PEP), which can be, for example a Broadband Services Router (BSR). A network controller can update ARP tables in the provider edge node to ensure that traffic which require policy enforcement can be routed to the PEP, whereas traffic which does not require policy enforcement can be normally routed towards the traffic's destination.

20 Claims, 12 Drawing Sheets

(56) References Cited

U.S. PATENT DOCUMENTS

2018/0006969 A1\* 1/2018 Venkateshaiah ........ H04L 45/02
2018/0006995 A1 1/2018 Bickhart et al.

\* cited by examiner

METHOD AND SYSTEM FOR NETWORK ACCESS DISCOVERY

TECHNICAL FIELD

This disclosure relates to the field of wireless communication networks in general, and to the field of network access discovery in particular.

BACKGROUND

In carrier access networks, a Broadband Services Router (BSR) acts as a policy enforcement point (PEP) and (OSI) Layer 3 GateWay (GW). The BSR operates in conjunction with a Remote Authentication Dial-In User Service (RADIUS) server that provides centralized Authentication, Authorization, and Accounting (AAA or Triple A) management for the service provider in authenticating, authorizing and optionally accounting for billing purposes. The BSR also includes, or interfaces with a Dynamic Host Configuration Protocol (DHCP) server for dynamically allocating Internet Protocol (IP) addresses and other parameters to devices.

However as all traffic flows through the BSR, the BSR can act as a network bottleneck, as all traffic, including both control plane signaling and user plane data flows, traverses the BSR. This can lead to network congestion. Further, the BSR represents a single point of failure, as all traffic flows through the BSR.

Accordingly, there is a need for an improved solution that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

Aspects of the disclosure provide a system and method used for receiving Address Resolution Protocol (ARP) requests from access nodes and returning a designated address to satisfy a service provider' policies. This can include receiving a request from an access node at a provider edge node, and returning a designated Media Access Control (MAC) address in response to a request for a MAC address for a specified destination IP address, the designated MAC address being a MAC address for a node other than the provider edge node. This can effectively route requests to a Policy Enforcement point (PEP), which can be, for example a Broadband Services Router (BSR). A network controller can update ARP tables in the provider edge node to ensure that traffic which require policy enforcement can be routed to the PEP, whereas traffic which does not require policy enforcement can be normally routed towards the traffic's destination.

An aspect of the disclosure provides a provider edge node including a network interface, a processor, and non-transitory machine readable memory storing machine executable instructions. The machine executable instructions, which when executed by the processor, causes the processor to implement a virtual routing and forwarding (VRF) function and an Address Resolution Protocol (ARP) mapper. The ARP mapper is configurable to return a designated Media Access Control (MAC) address in response to a request for a MAC address for a specified destination IP address, the designated MAC address being a MAC address for a node other than the provider edge node. In some embodiments, the network interface includes a first interface for communicating with a Multi Service Access Node (MSAN) and a second interface for communicating with a Broadband Services Router (BSR). In some embodiments, the provider edge node is configured to receive ARP table updates from a network controller. In some embodiments, the provider edge node is a combined layer 3 router and layer 2 switch. In some embodiments, the provider edge node is configured as an IP gateway. In some embodiments, the ARP mapper is configurable to update an ARP mapping table in response to instructions received from a Policy Enforcement point (PEP). In some embodiments, the ARP mapper is configurable to update an ARP mapping table in response to instructions received from a network controller. In some embodiments, the designated Media Access Control (MAC) address is for a Policy Enforcement point (PEP). In some embodiments, the ARP mapper includes MAC addresses for a backup PEP. In some embodiments, the network interface is configured to access layer 2 tunnels, and the designated MAC address is accessible via a layer 2 tunnel. In some embodiments, the designated Media Access Control (MAC) address is a layer 2 accessible MAC address for a Policy Enforcement point (PEP). In some embodiments, the designated Media Access Control (MAC) address is a layer 2 accessible MAC address for a Broadband Services Router (BSR).

Another aspect of the disclosure provides a network controller including a network interface, a processor; and non-transitory machine readable memory storing machine executable instructions. The machine executable instructions, when executed by the processor, causes the network controller to send Address Resolution Protocol (ARP) configuration messages to provider edge nodes configured with ARP mappers, the configuration messages including a media access control (MAC) addresses for a next hop node such that ARP requests received by the provider edge nodes route packets towards the next hop node. In some embodiments, the next hop node is accessible to the provider edge node. In some embodiments, the next hop node is accessible to the provider edge node via a layer 2 tunnel. In some embodiments, the next hop node is a Policy Enforcement point (PEP). In some embodiments, the machine executable instructions, further include instructions which, when executed by the processor, causes the network controller to monitor for PEP congestion and responsive to a PEP condition, sends configuration messages to a provider edge node to update a provider edge node's Address Resolution Protocol (ARP) mapper such that the provider edge node will return the MAC address of a backup PEP to requesting nodes. In some embodiments, the machine executable instructions further includes instructions which, when executed by the processor, causes the network controller to receive policy updates from Policy Enforcement point (PEP) and responsive to the received policy updates, update a provider edge node's Address Resolution Protocol (ARP) mapper. The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 2 additionally illustrates a first message flow, according to a first scenario.

FIG. 3 additionally illustrates a second message flow, according to a second scenario.

FIG. 4 additionally illustrates a third message flow, according to a third scenario.

FIG. 5 additionally illustrates a fourth message flow, according to a fourth scenario.

DESCRIPTION OF EMBODIMENTS

In carrier access networks, prior art Point to Point over Ethernet (PPPoE) protocols are often replaced with IP over Ethernet (IPoE) to provide multi-casting sessions. It is understood that IP is a layer 3 protocol, and Ethernet is a layer 2 protocol of the OSI protocol stack.

Figure 1:
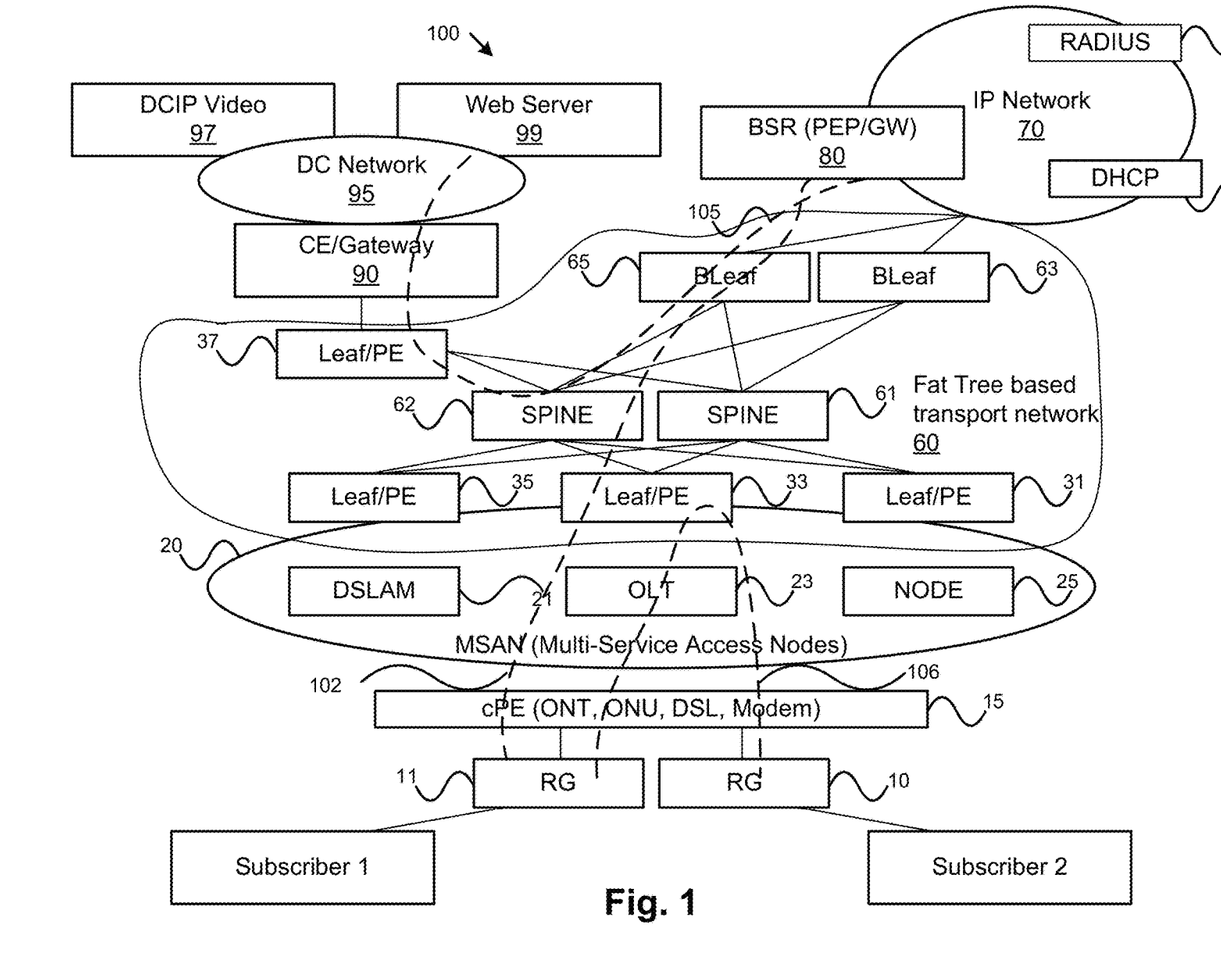
FIG. 1 illustrates an example network in which embodiments of the disclosure can be implemented.

FIG. 1 illustrates an example network 100 in which embodiments of the disclosure can be implemented. The network includes a service provider IP network 70. IP network 70 includes a Dynamic Host Configuration Protocol (DHCP) server 75 for dynamically allocating IP addresses and other parameters to devices. IP network 70 also includes a Remote Authentication Dial-In User Service (RADIUS) server 78 that provides centralized Authentication, Authorization, and Accounting (AAA or Triple A) management for the service provider in authenticating, authorizing, and optionally accounting for billing purposes. While a RADIUS server is illustrated, other network functions which provide AAA functionality can be used. IP network 70 further includes a Broadband Services Router (BSR) 80 which acts as a policy enforcement point (PEP) and GateWay (GW). The BSR 80 operates in conjunction with the DHCP server 75 and RADIUS server 78 to maintain a subscriber's profile, authenticate and authorize user requests for a service/session, allocating IP addresses and other parameters, and enforces access policy. The BSR 80 also acts as a layer 3 GW.

The service provider provides subscribers network access to a service, for example via residential GW (RG) 11 for subscriber 1 and via RG 10 for subscriber 2. Each RG 10, 11 connects to some form of customer premise equipment (cPE) 15, such as an Optical Network terminal/unit (ONT or ONU), Digital Subscriber Line (DSL) or Cable Modem, etc.

It should be appreciated that the RG 10, 11 and cPE 15 can be integrated into a single unit, for example a combined Cable Modem/WiFi router.

In FIG. 1, the service provider provides subscribers network access to a service via a Fat Tree based transport network 60 and Multi Service Access Nodes (MSAN) 20. The MSAN 20 can include a Digital Subscriber Line Access Multiplexer (DSLAM) 21, an Optical Line Terminal 23 or some other access aggregation node 25. It is noted that while there may be different types of MSANs, typically any session will only use one. Accordingly, in this application, communication paths will be shown as traversing the MSAN 20 generally, but not indicate any particular node, as any type of MSAN will suffice. The Fat Tree base transport network 60 includes Border Leaf (BLeaf) nodes 65 and 63 as leaf nodes which connect to the IP network 70, Provider Edge Leaf (Leaf/PE) nodes 35, 33 and 31 which connect to the MSAN 20, Leaf/PE 37, and Spine Nodes 62 and 61 which interconnect the BLeaf nodes 63, 65 to Leaf/PE nodes 31, 33, 35. Leaf/PE node 37 connects to a Carrier Edge (CE) gateway 90, which provides access to a Web Server 99, a Digital Cinema Implementation Partners (DCIP) Video Server 97 via a Data Center (DC) network 95. The Leaf/PE nodes 31, 33, 35, 37 act as both Layer 3 (e.g., IP) routers and Layer 2 Switches. The Spine nodes 61, 62 and Bleaf nodes 63, 65 also act as both Layer 3 (e.g., IP) routers and Layer 2 Switches.

Accordingly Subscribers can access video delivery services from DCIP Video Server 97 or browse web pages via Web Server 99 via the service provider's network. It is noted that while CE/Gateway 90 is labeled as a carrier edge gateway, the DCIP Video Server 97 can be operated by the service provider, for example if the service provider is a cable company or offers video on demand or subscribed video services.

When subscriber 1 sends a request for a web service provided by Web Server 99, the request traverses the path 102. The request traverses the RG 11, a cPE node 15, the MSAN 20, and then a path through the fat tree based transport network 60 (e.g., vie Leaf/PE node 33, spine node 62 and BLeaf 65) to the BSR 80. The BSR 80 processes the request, including authenticating and authorizing the request (for example using RADIUS server 78) to ensure the subscriber is authorized for the requested web service, and enforced policy through the PEP function of the BSR 80. The BSR 80 then forwards the request through path 105 which traverses the fat tree based transport network 60 (e.g., vie BLeaf node 65, spine node 62 and Leaf/PE node 37) to the CE/Gateway 90, which forwards the request through DC network 95 to the Web Server 99. Data for the requested web service continues to flow back and forth between the Web Server 99 and the RG 11 through paths 102, 105, as the BSR 80 acts as the IP gateway for the web service.

While the network shown in FIG. 1 allows for all traffic to flow through the PEP of the BSR 80, there are a couple of problems with this network. First, the BSR 80 can act as a network bottleneck, as all directional traffic, including both inbound and outbound user plane data flows, traverses the BSR 80. This can lead to network congestion. Further, the BSR 80 represents a single point of failure, as all traffic flows through the BSR 80.

Another potential problem with this network is it can potentially lead to direct subscriber communication, as illustrated by path 106, without the traffic passing through a PEP. For example, Layer 2 traffic can be passed directly from RG 11 to RG 10 via the Leaf/PE node 33, and the MSAN 20, without passing through the PEP of the BSR 80.

This can violate the service provider's policies. A service provider typically prohibits traffic from flowing directly between subscribers for two reasons. First, such traffic bypasses accounting services. Second, there can be security hazards to subscribers. Accordingly, a service provider may prefer all traffic from a first subscriber directed to a second subscriber flows through the PEP.

FIGS. 2-5 illustrate an improved network to address these problems, with each of FIGS. 2-5 illustrating different example scenarios in which message flows are overlaid over a common network, according to embodiments of the disclosure.

Figure 2:
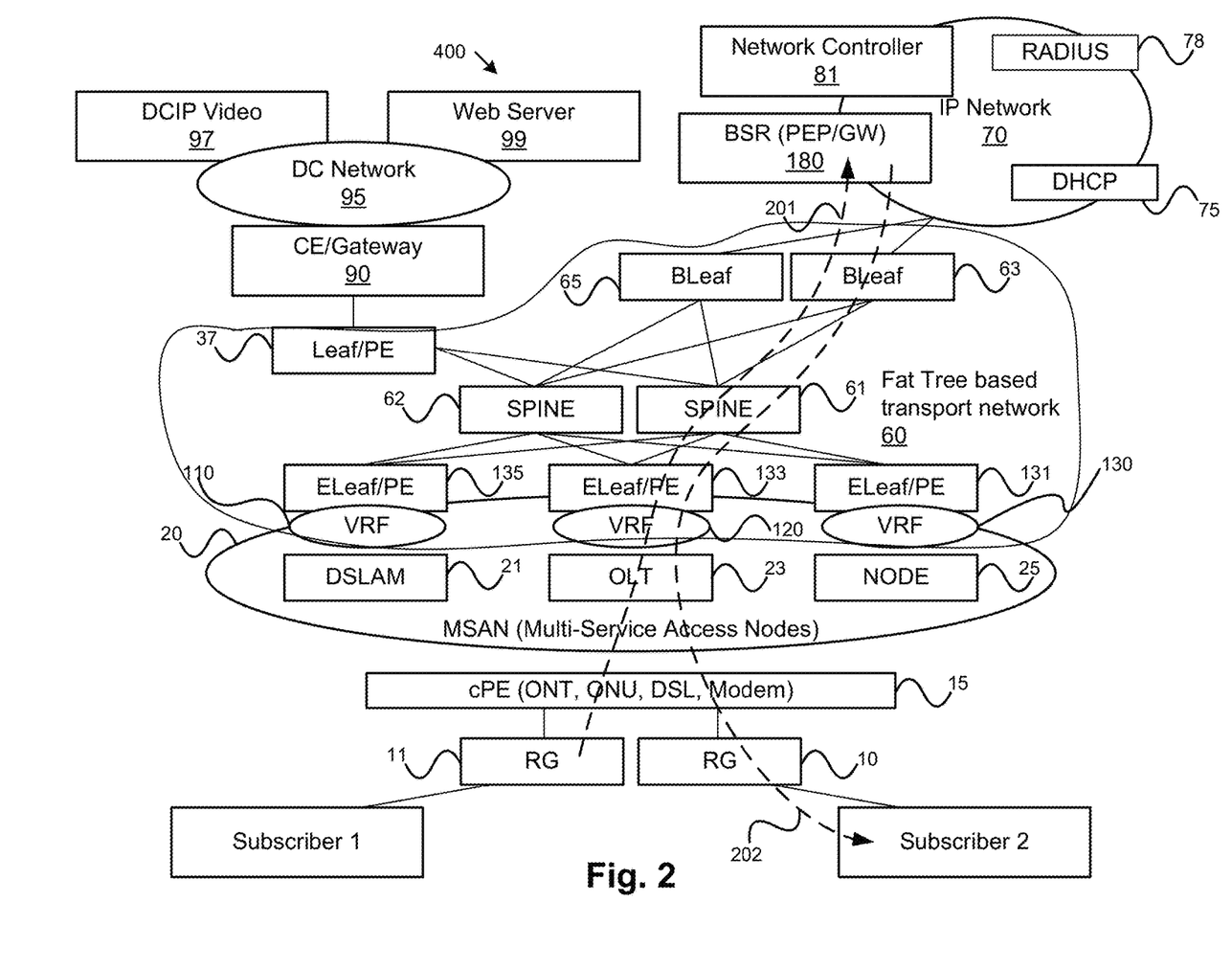
FIGS. 2-5 illustrate an improved network, according to embodiments of the invention.

FIG. 2 illustrates an improved network, in which each Leaf/PE 35, 33 and 31 adjacent to the MSAN 20 is replaced with an enhanced (E) Leaf/PE 135, 133 and 131 respectively. Each enhanced Leaf/PE 135, 133 and 131 is configured with L3 GW functionality, such that the BSR 180 can distribute the L3 GW function to the enhanced leaf nodes. Accordingly, including L3 GW functionality in each of enhanced Leaf/PE 135, 133 and 131 advantageously reduces the bottle neck congestion resulting from having all traffic routed through the BSR 180. Each enhanced Leaf/PE 135, 133 and 131 is also configured with a virtual routing and forwarding (VRF) function and an address resolution protocol (ARP) mapper. The VRF function also sets each RG default gateway IP address pointing to an VRF interface, for example via DCHP. Accordingly enhanced Leaf/PE 135 is configured to implement VRF function 110 and an ARP mapper, enhanced Leaf/PE 133 is configured to implement VRF function 120 and an ARP mapper, and enhanced Leaf/PE 131 is configured to implement VRF function 130 and an ARP mapper). BSR 180 is configured to interface with a network controller 81, such as a software defined networking (SDN) controller. Network Controller 81 is configured to update the ARP tables in each ARP mapper, as will be discussed below. The remaining network is substantively the same as the network of FIG. 1. It is noted that the ARP mappers operate differently than a conventional ARP proxy, which will be discussed below.

FIG. 2 illustrates a scenario in which the enhanced Leaf/PE node 133 can enforce carrier policy for inter-subscriber traffic, according to an embodiment. Accordingly traffic which was allowed to flow through path 106 in FIG. 1 is now routed through the BSR 180. Accordingly traffic from RG 11 directed to RG 10 now follows the paths 201 and 202. The traffic received at the ELeaf/PE 133 from RG 11 which is directed to RG 10 is instead routed to the BSR 180 via the VRF function 120 of Leaf/PE node 133. In brief the ARP mapper of VRF function 120 directs the traffic which is addressed to the RG 10 towards the BSR 180 through the fat tree transport network 60. It should be understood that the BSR 180 enforces carrier policy via its PEP before routing the traffic back through the Fat tree based transport network 60 to Leaf/PE 133 for forwarding through the MSAN 20 to the RG 10.

Figure 3:
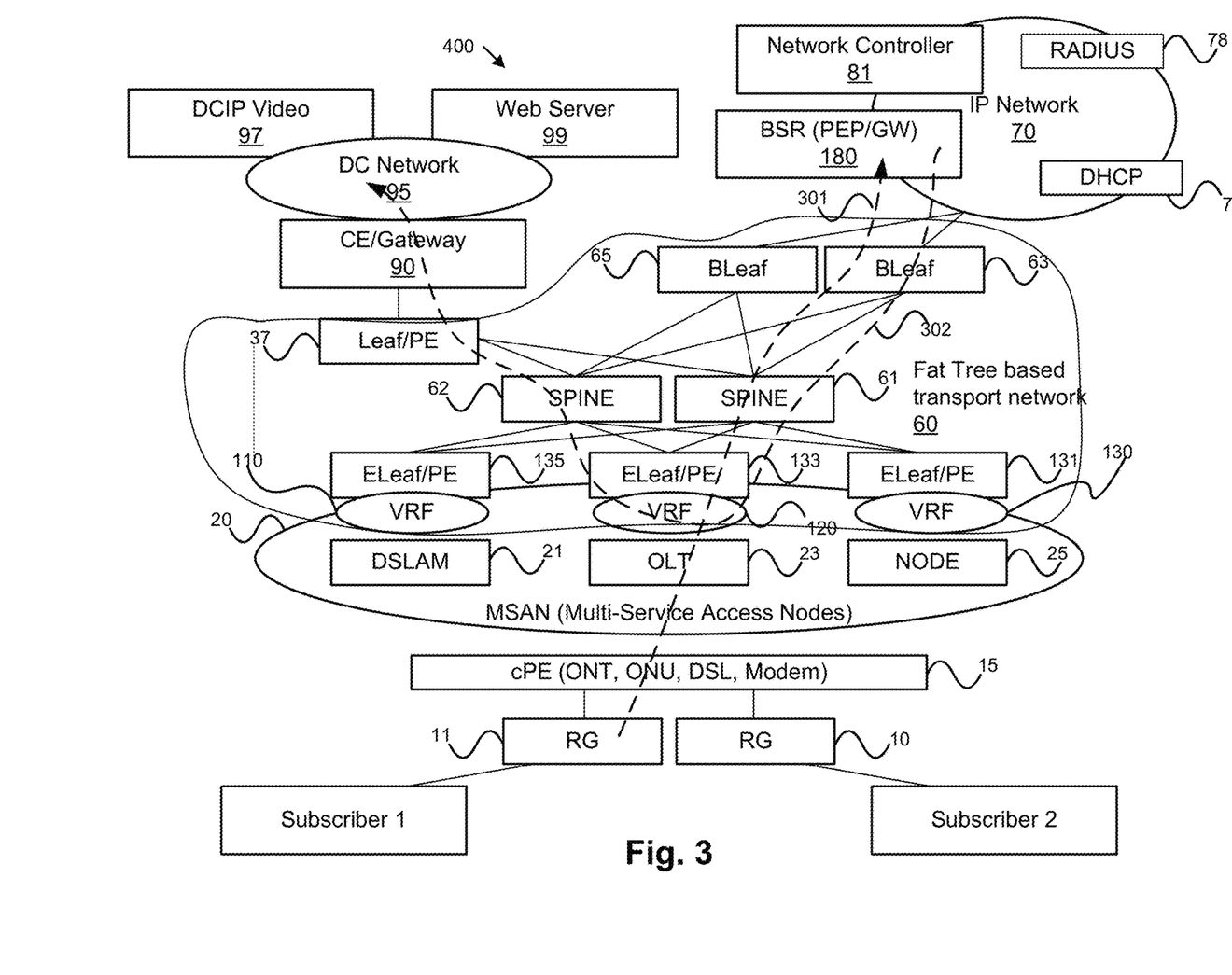

FIG. 3 illustrates a scenario in which the enhanced Leaf/PE node can direct any outbound traffic toward the PEP of the BSR 180, according to an embodiment. An example will be discussed with respect to a request for a service reachable through the DC network 95 (e.g., Web Server 99 or DCIP Video Server 97). The request is received at the Leaf/PE node 133 from RG 11. Although the request is directed to a DC network service 95, the request is instead routed to the BSR 180 via the VRF function 120 of Leaf/PE node 133. In other words, the request follows path 301. Once again, the ARP mapper of VRF function 120 directs the outbound traffic towards the BSR 180 through the fat tree transport network 60. After the BSR 180 performs the AAA and PEP functions, the BSR 180 routes the outbound traffic toward the DC network 95 via the fat tree transport network 60. In the scenario illustrated, the request is routed through the enhanced Leaf /PE node 133 and VRF function 120 towards the DC network 95, as shown by dashed line 302, although the request can be routed through other paths, such as path 105 of FIG. 1.

Figure 4:
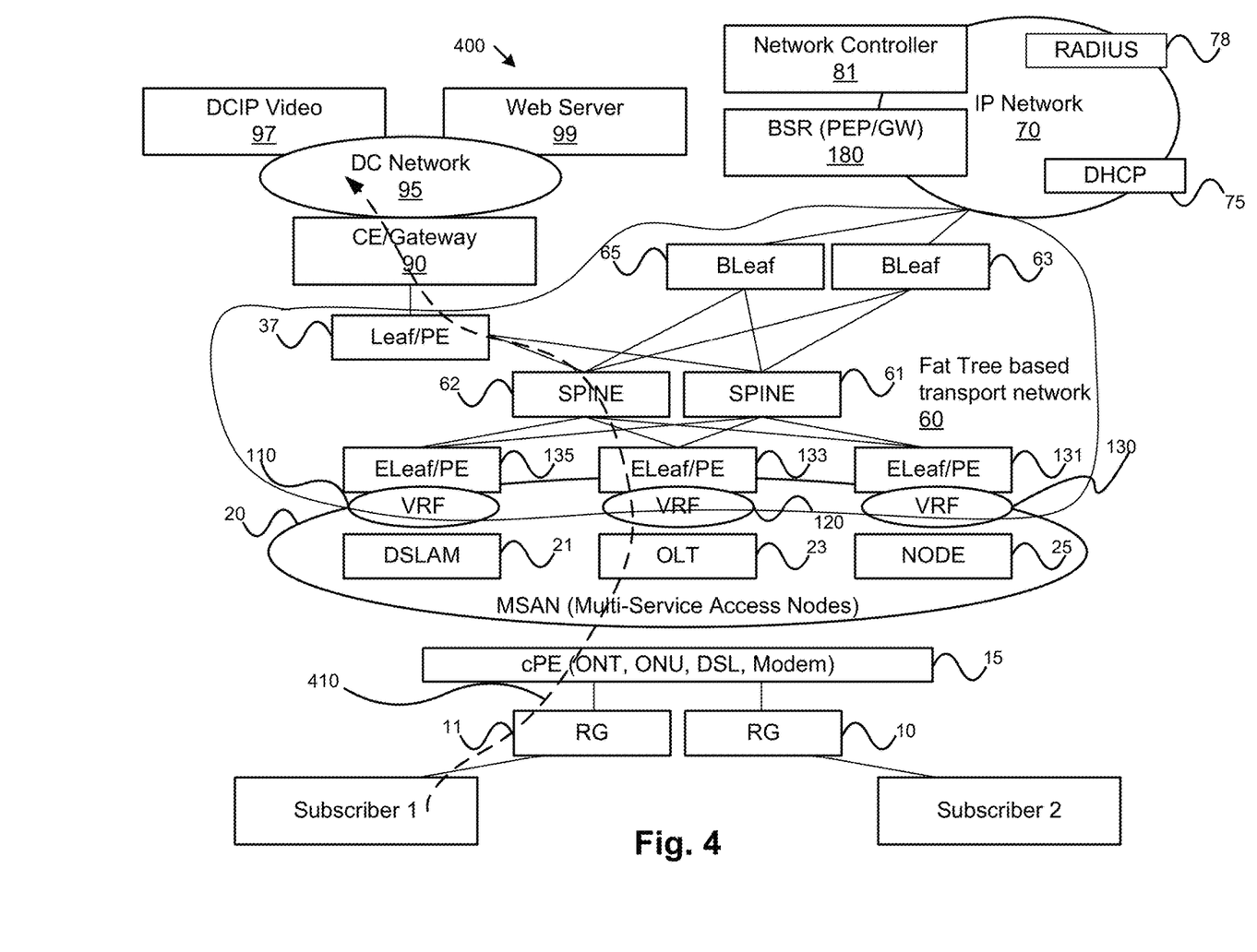

However, not all traffic necessarily needs to be routed through the BSR 80. In some situations, e.g., the subscriber has already been authorized to view a requested movie from video server 97, follow-up outbound traffic can be sent directly to the video server 97. Accordingly, FIG. 4 illustrates a scenario in which the enhanced Leaf/PE node 133 can direct outbound traffic 410 directly toward the DC 95 without traversing the PEP of the BSR 180. In this case, the ARP mapper table of VRF 120 is configured to direct the traffic directly towards the DC network.

Figure 5:
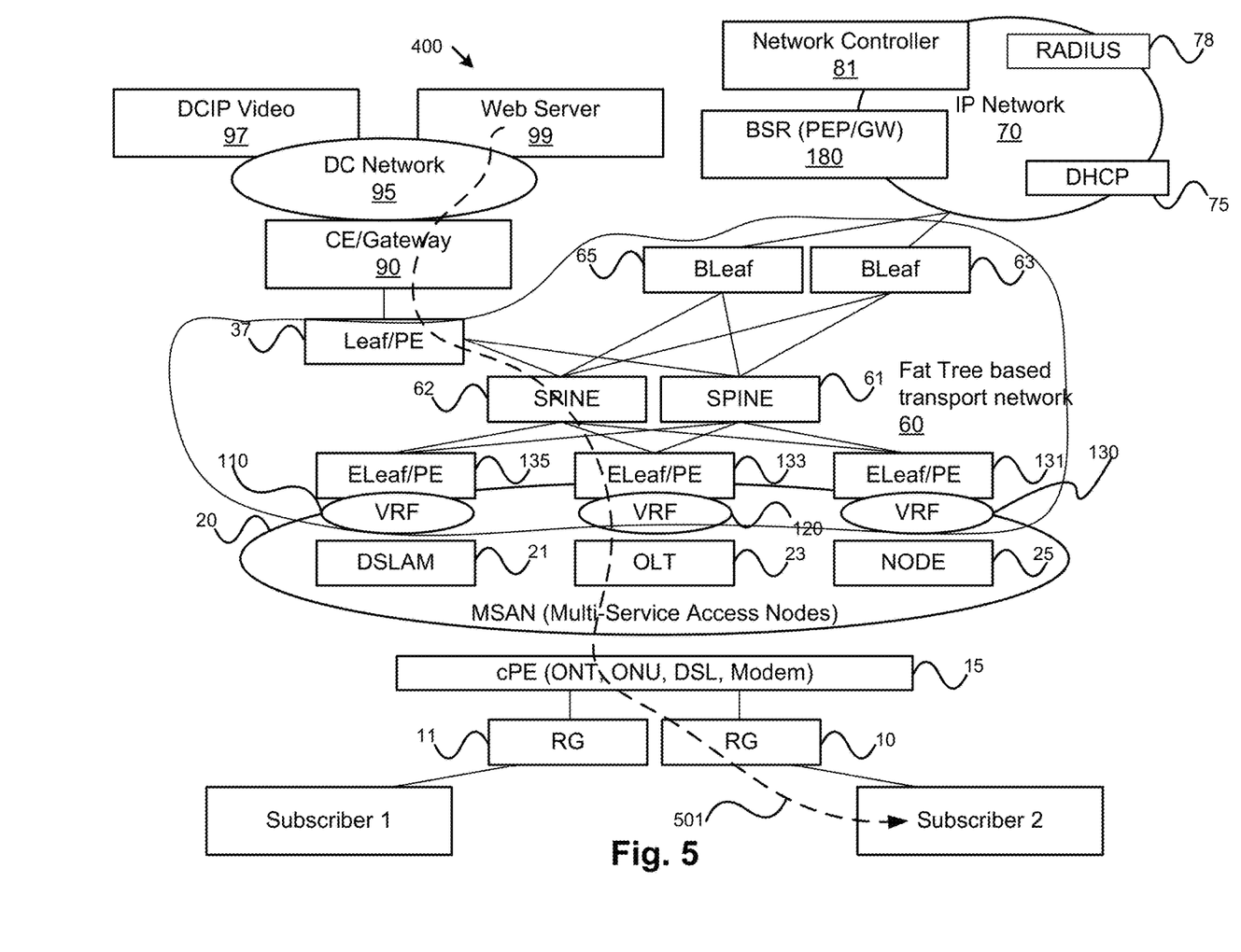

FIG. 5 illustrates a scenario in which the enhanced Leaf/PE node 133 operates as a L3 GW, according to an embodiment. As shown by path 501 inbound traffic from the DC 95 can be routed via the Leaf/PE node 133 directly toward the RG 10 without traversing the PEP of the BSR 180. This can mitigate the bottleneck of prior art systems in which all inbound traffic was routed through the PEP of BSR 80, especially when the inbound traffic exceeds the outbound traffic (as is typically the case). It is noted that while FIG. 5 illustrates the traffic flowing to subscriber 2 via RG 10, it should be understood that same principles can be applied to other inbound traffic to other subscribers.

Figure 6:
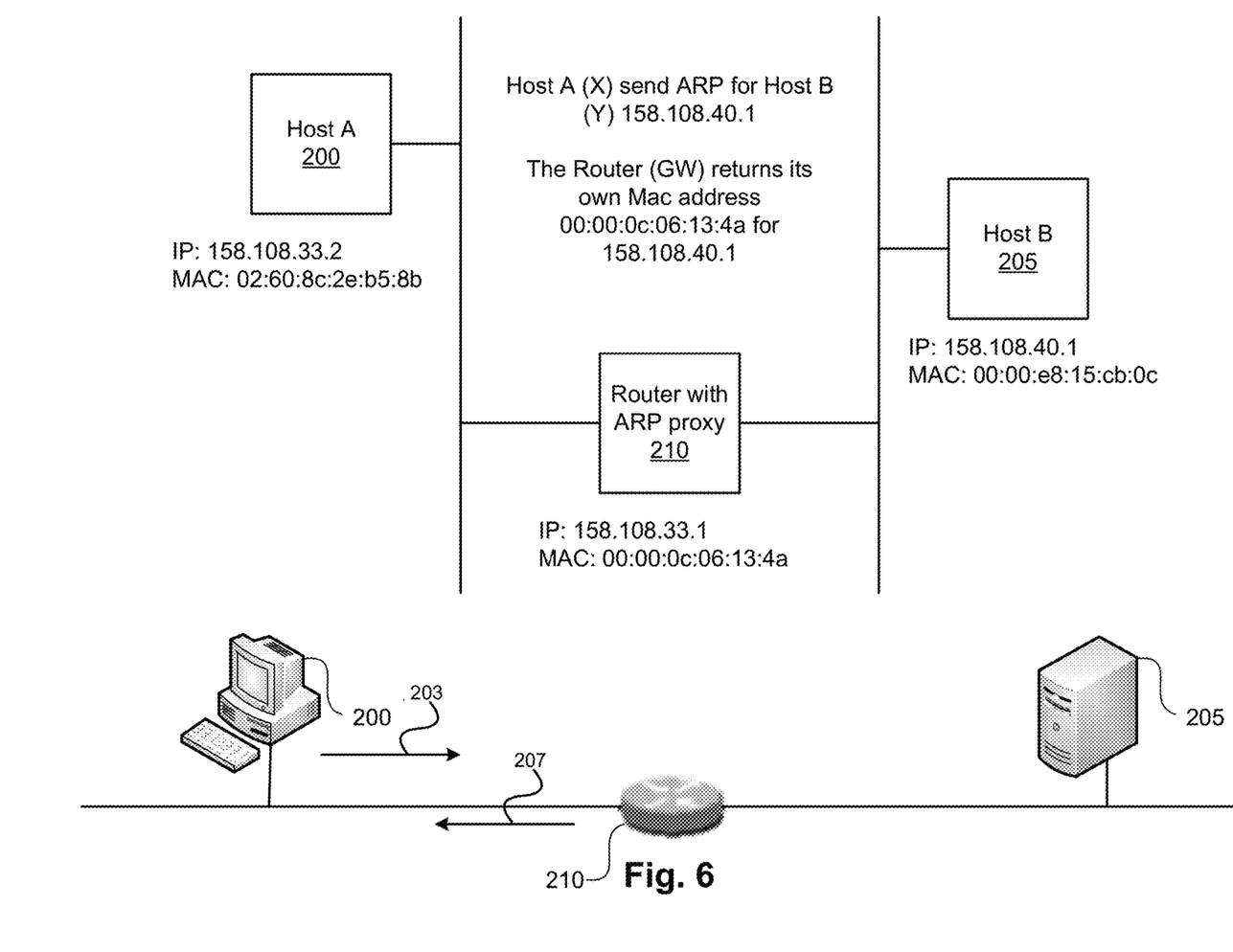
FIG. 6 illustrates conventional ARP mapping.

FIG. 6 illustrates the operation of a conventional ARP proxy function by a Router 210. In FIG. 6 Host A 200, Host B 205, and the Router 210 each have IP and MAC addresses as illustrated. In the illustrated scenario, Host A 200 has packets to be delivered to Host B 205. Host A 200 and Host B 205 are not directly connected (e.g, they are not on the same LAN) and traffic between them needs to be routed by router 210. Host A 200 sends an ARP request 203 to the router 210 requesting the MAC address corresponding to the IP address (158.108.40.1) for Host B 205. This occurs as Host A 200, not being on the same LAN, is not aware of Host B's MAC address, but is aware of the IP address (158.108.40.1) of Host B 205. The Router 210 returns its own Mac address 00:00:0c:06:13:4a as a substitute for 158.108.40.1 in message 207. Accordingly Host A 200 can send the packets to the Mac address 00:00:0c:06:13:4a of Router 210, which will in turn route the packets to Host B 205.

Figure 7:
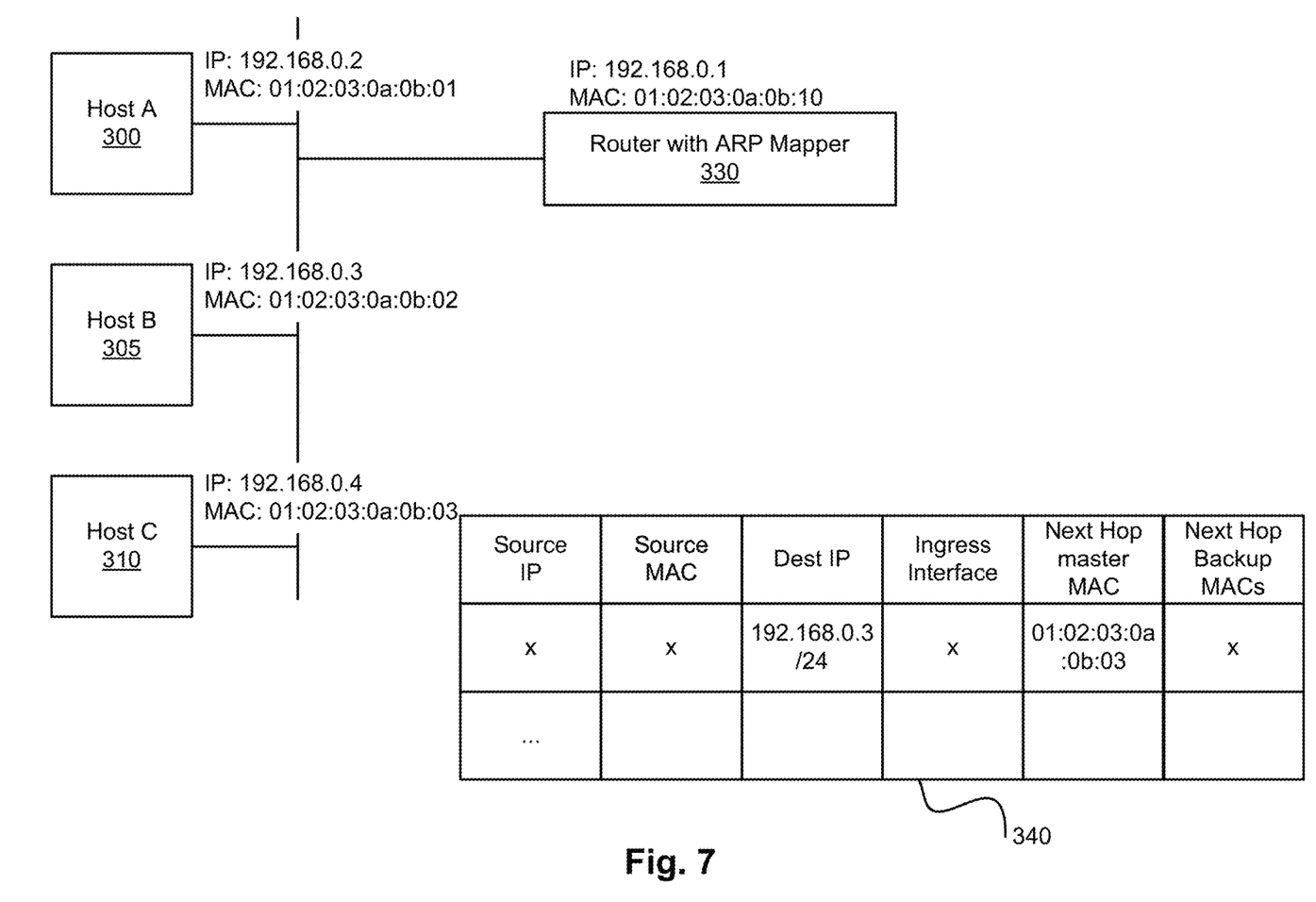
FIG. 7 illustrates a provider edge node (router) with an enhanced ARP mapper, according to an embodiment.

FIG. 7 illustrates an improved ARP method and system, according to an embodiment. In FIG. 7 Router 330 is configured with an ARP mapper. Router 330 can be, for example the enhanced Leaf/PE node 133, which implements VRF function 120 and implements the ARP mapper. In FIG. 7 Host A 300, Host B 305, Host C 310 and the Router 330 each have IP and MAC addresses as illustrated. FIG. 7 also includes a partially filled out ARP table 340 which the ARP mapper uses to respond to ARP requests. The ARP table 340 is configurable, such that the Router 330 can receive instructions from a network controller, such as network controller 81, to update the ARP table 340. The ARP table 340 is partially filled to highlight the fields important for an example scenario. In response to an ARP request, the ARP mapper returns the MAC address of the next hop node according to the APR table. In the example scenario, ARP mapper is configured to return the MAC address of Host C 310 for requests for a destination address for Host B 305 based on a table 340.

Host A sends an ARP request for Host B 192.168.0.3/24. For example, Host A can be RG 11 and Host B can be Web Server 99 in FIGS. 2-5. It should be noted that the /24 in the destination IP address shown in the ARP table 340 is just an example to illustrate that the mapping can be performed on an IP prefix, such as a subnet mask, rather than on every individual IP address. The Router 330 can be configured to direct packets addressed to Host B to any other node, for example a PEP, which can be located, for example in the BSR 180 of FIGS. 2-5. This is accomplished by configuring the ARP table 340 to return the MAC address of the next hop node in the path to the configured destination. The configured destination can be varied, for example based on policy. For example, in some cases the configured destination can be the BSR 180, and the next hop node is the spine node 61 of FIG. 2. In other cases, such as that illustrated in FIG. 4, the configured destination can be a DC network service 95 and the next hop node is spine node 62. Accordingly the ARP table 340 is configured with the MAC address 01:02:03:0a:0b:03 of Host C 310. It is noted that this differs from the conventional ARP proxy scenario illustrated in FIG. 6, as Router 330 does not return the MAC address of itself, but rather the next hop node address (e.g. address of the next hop node(. The MAC address of the BSR 180 is the next hop node address in this example, which is returned as the ARP response.

It is noted the ARP table 340 of an ARP mapper can be configured with any accessible MAC address to redirect packets as needed. A MAC address of a destination device is considered accessible by a source device if there is a L2 tunnel established (e.g., Virtual LAN (VLAN) tunnel, Virtual Extensible LAN (VXLAN) tunnel, Generic Routing Encapsulation (GRE) tunnel, etc.) between the two, or if both devices are on the same subnet. It is noted that other transport networks which allow for Layer 2 tunnels can be used instead of the Fat Tree Transport Network 60.

Figure 8:
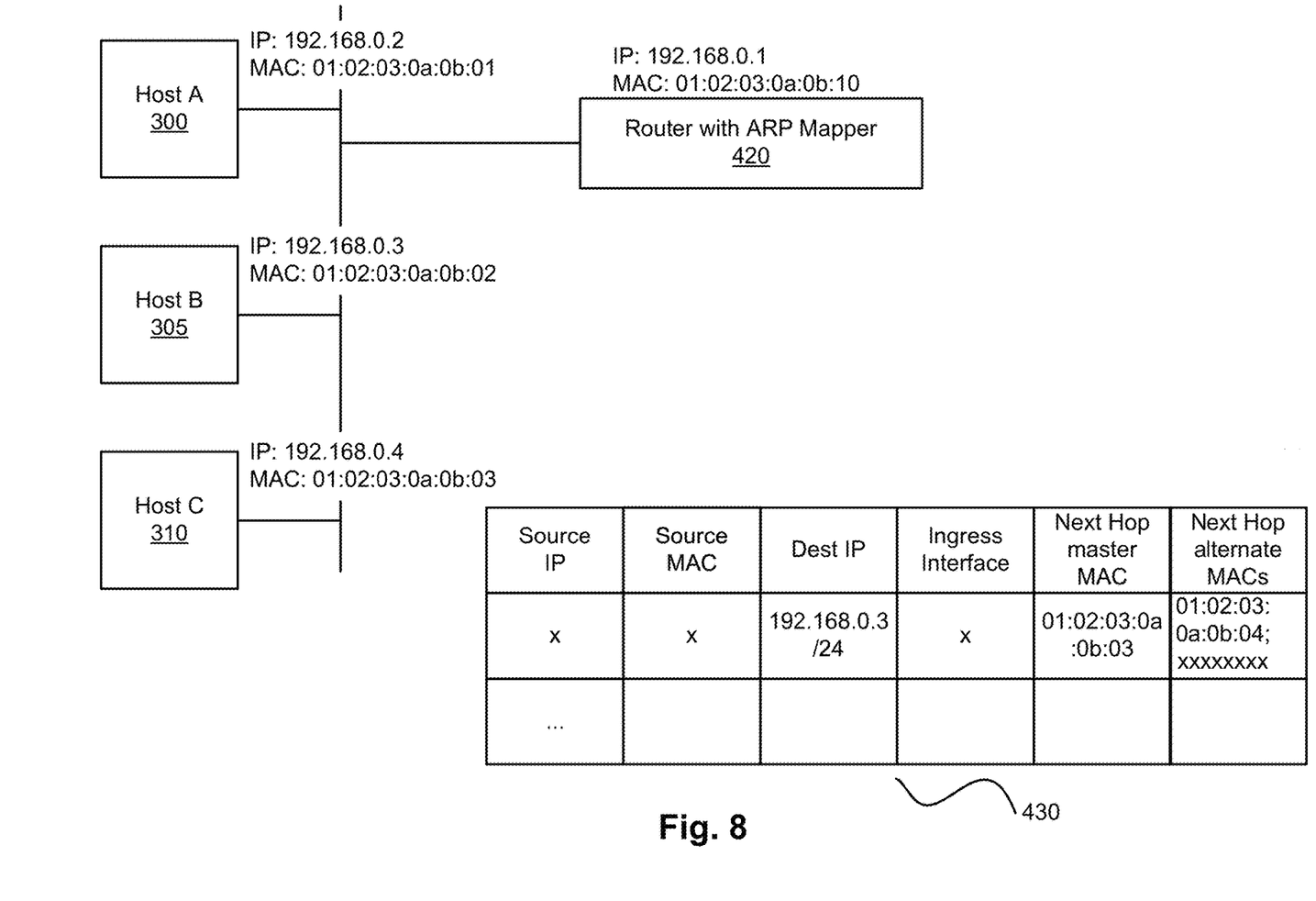
FIG. 8 illustrates a provider edge node (router) with an enhanced ARP mapper, according to an embodiment which utilizes alternate next hop node routing.

FIG. 8 illustrates an improved ARP method and system, with multiple possible next hop nodes, according to an embodiment. In FIG. 8, Host A 300, Host B 305 and Host C 310 are the same as in FIG. 7. However the Router 420 is configured with an ARP mapper having expanded ARP table 430, which designates a Master next hop node MAC address and an Alternate next hop node MAC address. The example illustrated in FIG. 8 operates similar to that described for FIG. 7, except as set out below.

In FIG. 8, Host A 300 once again sends an ARP request for the MAC address of Host B 192.168.0.3. Here the ARP table includes multiple possible MAC addresses, a master (default) MAC address and at least one alternate MAC address. Accordingly the Router 420 can return an ARP response to the ARP request which includes the HOST C 310 Mac address 01:02:03:0a:0b:03 (the master next hop node). Alternatively, the ARP mapper can return one of the alternate MAC addresses (e.g, 01:02:03:0a:0b:04 (host not shown) or xxxxxx (host not shown)) for 192.168.0.2 based on some load balancing basis. Examples of the load balancing basis can include round robin, load status or some High Availability (HA) strategy. Further if the master next hop node host is congested or fails to respond, the Router 420 can respond to the request with one of the alternate MAC addresses. This can be achieved using network controller 81, which can monitor the status of the master and alternate nodes and update the MAC mapping table 430 accordingly.

In some embodiments the network controller 81 can form part of the BSR 180, or, as shown, be a separate network controller such as an SDN controller or a traffic engineering entity responsible for load balancing and ensuring high availability of network services.

Figure 9:
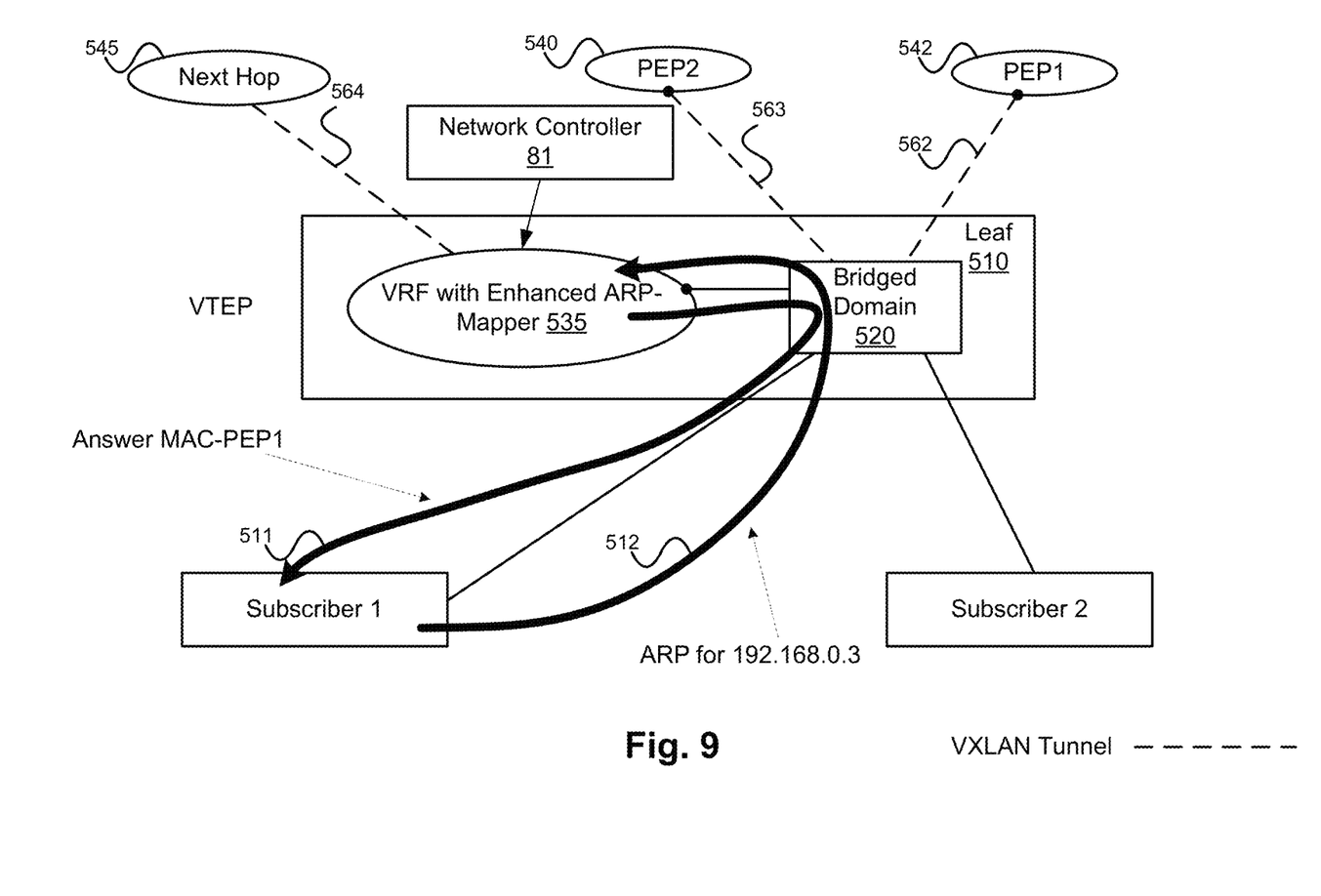
FIG. 9 illustrates an ARP request in a scenario using a Virtual Extensible LAN (VLAN) overlay network, according to an embodiment.

FIG. 9 illustrates an ARP request in a scenario using a Virtual Extensible LAN (VLAN) overlay network, according to an embodiment. In FIG. 9, VXLAN tunnels 562,563, 564 are illustrated in dashed lines. In FIG. 9 a Leaf/PE node 510 is illustrated as including a bridged domain (BD) function 520 and a VRF function enhanced with an ARP Mapper 535. The BD function 520 is a layer 2 switch whereas the VRF function enhanced with an ARP Mapper 535 is a logical layer 3 router. It should be understood that both BD function 520 and VRF function enhanced with an ARP Mapper 535 can be incorporated into a single entity which does both Layer 2 switching and layer 3 routing. In FIG. 9, PEP1 542 is a default PEP for subscriber 1 and subscriber 2, but PEP2 540 is a backup PEP should PEP1 542 be congested or under service. Next Hop node 545 represents the next hop node in a path for reaching a node delivering a requested service. Subscriber 1 sends an ARP request 512 for the node delivering a requested service (e.g, Web Server 99 of FIG. 2). The ARP mapper of the VRF function enhanced with an ARP Mapper 535 returns an ARP response 511 which includes the MAC address for a PEP in order to achieve carrier policy. The address of the PEP to be returned is determined by the ARP mapper table of the VRF function enhanced with an ARP Mapper 535, as configured by the Network Controller 81.

It will be appreciated that the node 510 can include a network interface including a plurality of ports, a processor, and non-transient machine readable memory storing machine executable instructions, which when executed by the processor causes the node to perform the methods described herein. For example the Leaf/PE node 510 can be configured by updating the machine readable instructions, or updating data in the tables described herein. The Leaf/PE node 510 can be configured by receiving instructions from network controller 81 using the node's network interface. According to an embodiment High Availability carrier policy enforcement can be achieved as follows. The Leaf/PE node 510 can be configured such that the BD function 520 drops all ARP packets on all the ports destined to the Subscribers, except as follows. The BD function 520 is configured to Allow ARP packets to/from VRF function enhanced with an ARP Mapper 535. This ensures all ARP requests are responded by the VRF 535, which is configured according to carrier policy. The VRF ARP tables are configured with the MAC addresses of PEP1 and PEP2. For ARP requests received from subscribers, VRF function enhanced with an ARP Mapper 535 is configured to respond with the MAC address of a configured PEP, for instance, the MAC address of PEP1 542. However, a management plane controller can monitor the status of the configured PEP. If the PEP1 542 is congested or otherwise not responsive, the management plane controller can configure the VRF function enhanced with an ARP Mapper 535 to respond to ARP requests from subscribers with the MAC address of PEP2 542.

Figure 10:
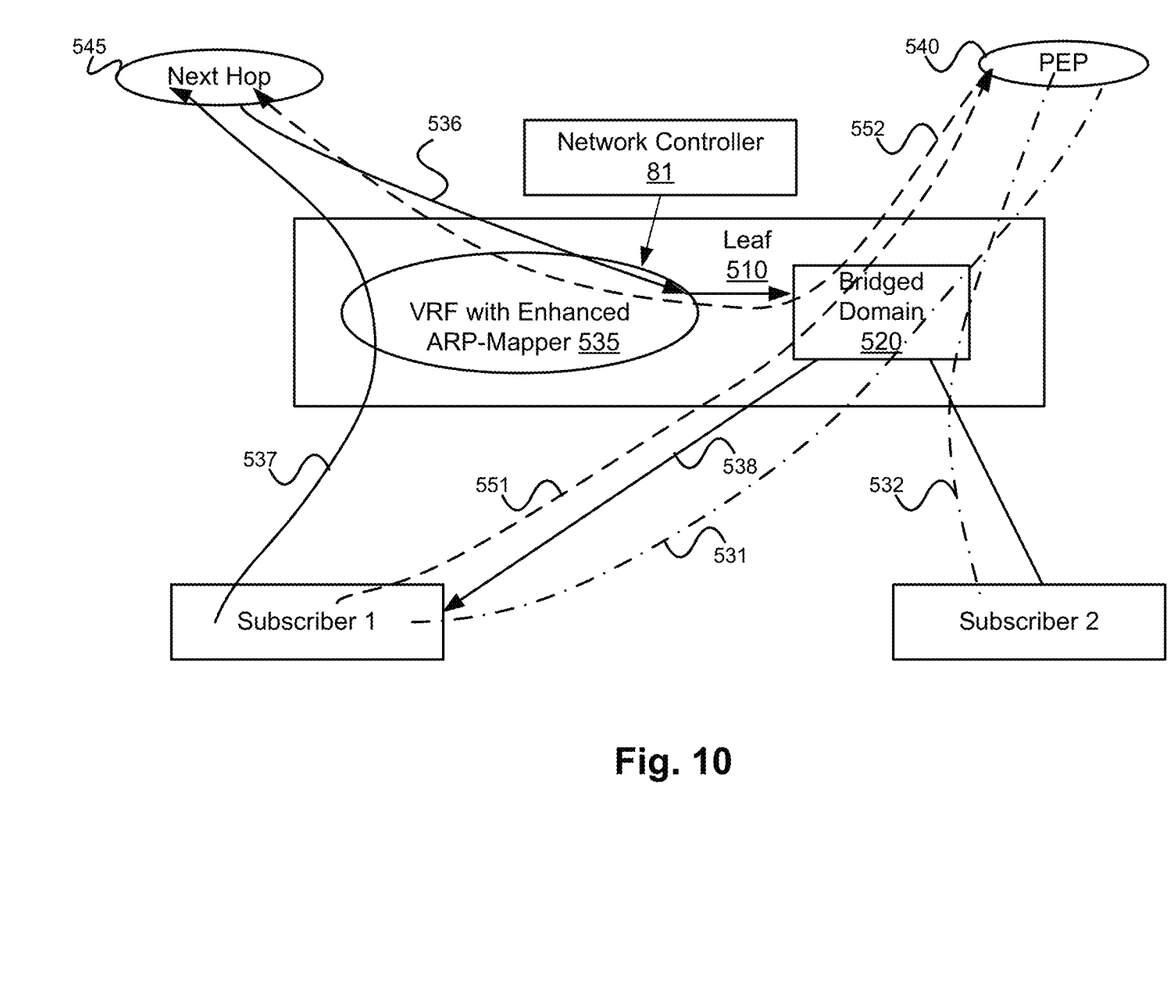
FIG. 10 illustrates traffic flows in a scenario using a VLAN overlay network, according to an embodiment.

FIG. 10 illustrates traffic flows in a scenario using a VLAN overlay network, according to an embodiment. The network can be the same as that of FIG. 9, but in order to highlight the traffic flows the VXLAN tunnels and the PEP2 are not shown. In FIG. 10, traffic requests originating from subscribers are illustrated with dashed lines such as request 551, which is routed to the PEP 540. The PEP 540 then sends the request to the Next Hop node 545 via path 552. Traffic between subscribers is illustrated with dashed/dotted lines 531 and 532, which is routed through the PEP 540 by the Leaf node 510. Inbound traffic from Next Hop node 545 is shown in solid lines 536, 538 and is directly routed to Subscribers, so PEP 540 offloading is achieved. Outbound traffic which does not require PEP 540, such as acknowledgements, or pausing, rewinding instructions in the case of video services, can be routed directly to the Next Hop node 545 as shown in path 537. It is noted that the traffic on the same subnet, or accessible by a Layer 2 tunnel, such as VXLAN tunnels 562, 563 and 564 (FIG. 9) can be switched by layer 2 switch BD function 520. IP traffic with IP destination addresses on different subnets, or not accessible via a layer 2 channel will be IP routed by VRF function enhanced with an ARP 535.

Figure 11:
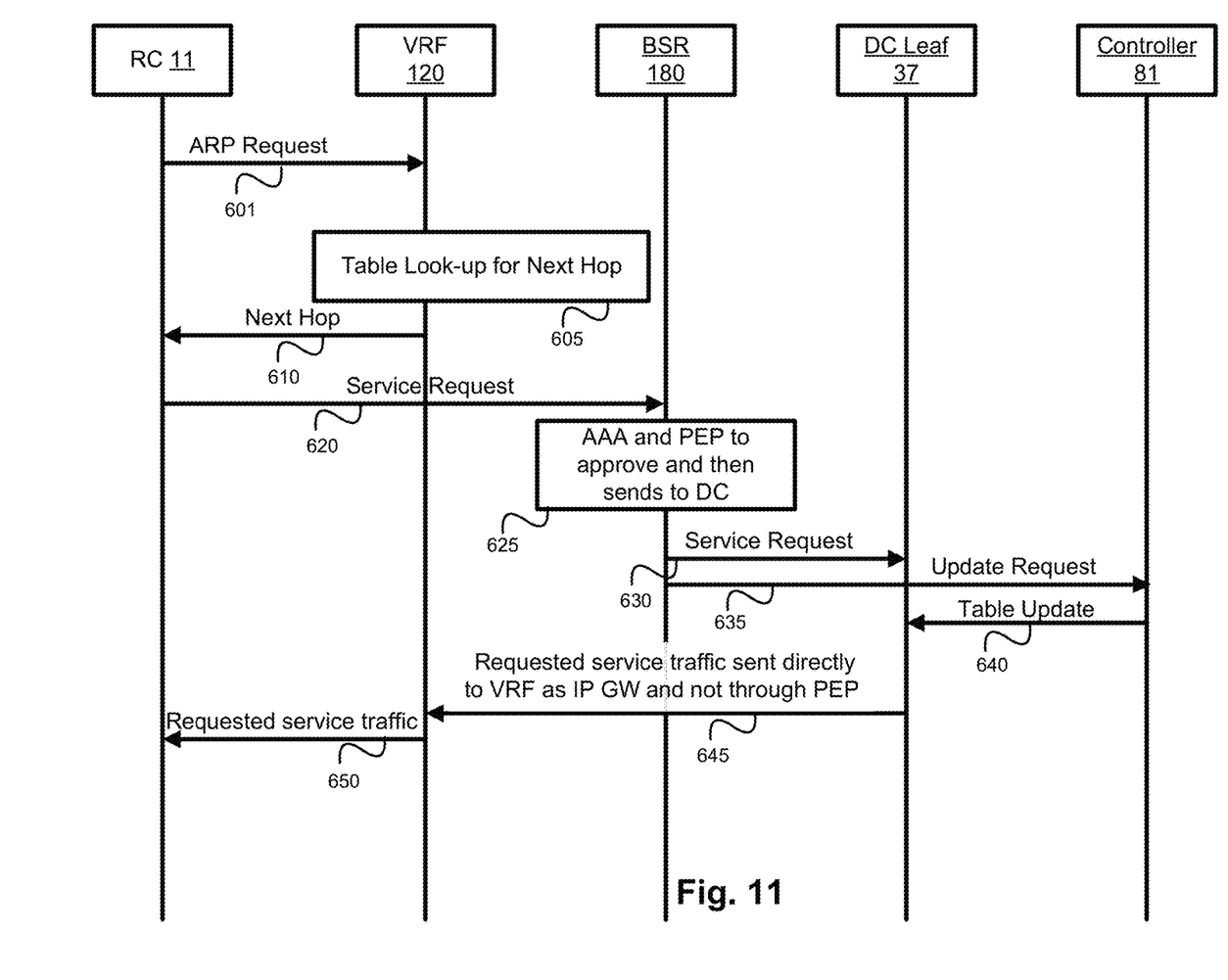
FIG. 11 is a call flow figure illustrating a method according to an embodiment.

FIG. 11 is a call flow figure illustrating a method according to an embodiment. RC 11 sends an ARP request 601 to the VRF function 120 (of ELeaf/PE node 133). The VRF function 120, which includes an ARP mapper as described above, performs a table look-up 605 for the next hop node. The MAC address of the next hop node is returned via response 610. In this example, BSR 180 is the next hop node. The RC 11 then sends a service request 620 to the BSR 180 based on the received next hop node address (which routes the Service request 620 to the BSR 180 if there are intermediate hop nodes). The BSR 180 performs AAA and PEP procedures 625 before routing approved Service request 630 towards the requested DC server 95 via the DC Leaf node 37. The BSR 180 also sends an update request 635 to the network controller 81. Network controller 81 sends table update message 640 to update the routing table of DC leaf node 37, and possibly updates other routing tables, for example of the VRF function 120. The VRF function 120 acts as the L3 GW once the service request 620 is approved by the BSR 180. Accordingly, Leaf node 37 then directs service traffic 645 (data from the requested server) directly to the VRF function 120. The VRF function 120 then directs requested service traffic 650 to the RG 11.

Figure 12:
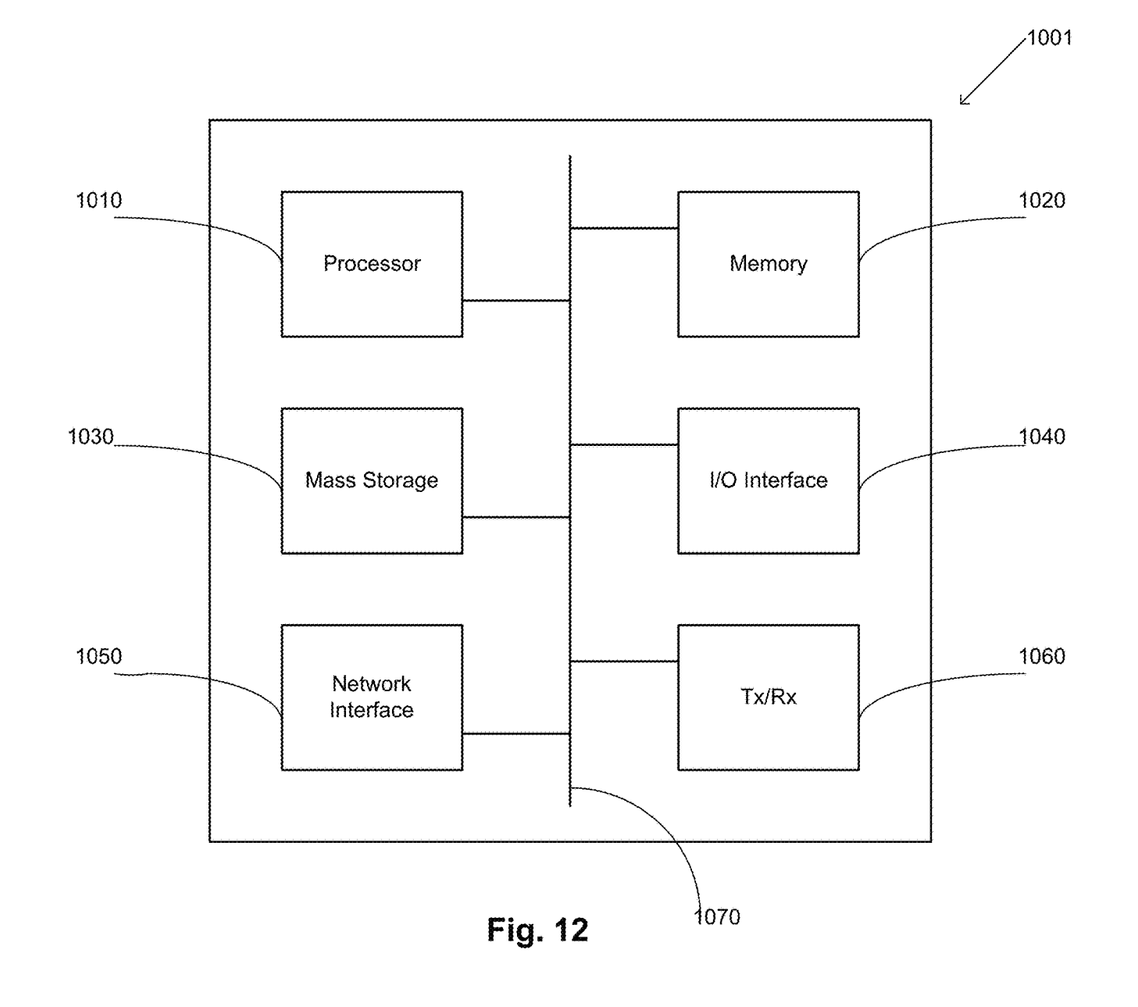
FIG. 12 is an exemplary block diagram of a processing system that may be used for implementing the various network functions.

FIG. 12 is an exemplary block diagram of a processing system 1001 that may be used for implementing the various network functions. As shown in FIG. 11, processing system 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1401 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for performing the aforementioned functions and steps.

The processing system 1001 can be used to implement the network elements described herein including a router 330, 420 configured with an ARP mapper (such as one of the enhanced Leaf/PE nodes 131, 133, 135), or a network controller 81 for updating ARP tables in routers/nodes equipped with ARP mappers, or PEP or BSR 180.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A provider edge node comprising:
   a network interface;
   a processor; and
   a non-transitory machine readable memory storing machine executable instructions, which when executed by the processor causes the processor to:
   implement a virtual routing and forwarding (VRF) function; and
   implement an Address Resolution Protocol (ARP) mapper;
   the ARP mapper is configurable to return a designated Media Access Control (MAC) address in response to a request for a MAC address for a specified destination Internet Protocol (IP) address, the designated MAC address being a MAC address for a node other than the provider edge node, the ARP mapper configurable to update an ARP mapping table in response to instructions received from a network controller, the ARP mapper including MAC addresses for a backup Policy Enforcement point (PEP).

2. The provider edge node of claim 1, wherein the network interface comprises:
   a first interface for communicating with a Multi Service Access Node (MSAN); and
   a second interface for communicating with a Broadband Services Router (BSR).

3. The provider edge node of claim 2 wherein the provider edge node is configured to receive ARP table updates from the network controller.

4. The provider edge node of claim 1 wherein the provider edge node is a combined layer 3 router and layer 2 switch.

5. The provider edge node of claim 2 wherein the provider edge node is configured as an IP gateway.

6. The provider edge node of claim 1 wherein the ARP mapper is configurable to update the ARP mapping table in response to instructions received from a Policy Enforcement point (PEP).

7. The provider edge node of claim 1 wherein the designated Media Access Control (MAC) address is for a Policy Enforcement point (PEP).

8. The provider edge node of claim 1 wherein the network interface is configured to access layer 2 tunnels, and the designated MAC address is accessible via a layer 2 tunnel.

9. The provider edge node of claim 8 wherein the designated Media Access Control (MAC) address is a layer 2 accessible MAC address for a Policy Enforcement point (PEP).

10. The provider edge node of claim 8 wherein the designated Media Access Control (MAC) address is a layer 2 accessible MAC address for a Broadband Services Router (BSR).

11. A network controller comprising:
a network interface;
a processor; and
non-transitory machine readable memory storing machine executable instructions, which when executed by the processor causes the network controller to:
send Address Resolution Protocol (ARP) configuration messages to provider edge nodes configured with ARP mappers, the ARP configuration messages including a media access control (MAC) address for a next hop node such that ARP requests received by the provider edge nodes route packets towards the next hop node, the next hop node accessible to one of the provider edge nodes, the next hop node being a Policy Enforcement point (PEP); and
monitor for PEP congestion and responsive to a PEP condition, send the ARP configuration messages to the one of the provider edge nodes to update the one of the provider edge nodes' Address Resolution Protocol (ARP) mapper such that the one of the provider edge nodes will return a MAC address of a backup PEP to requesting nodes.

12. The network controller of claim 11 wherein the next hop node is accessible to the provider edge node via a layer 2 tunnel.

13. The network controller of claim 11 further comprising machine executable instructions which, when executed by the processor, causes the network controller to receive policy updates from the PEP and responsive to the received policy updates, update a provider edge node's Address Resolution Protocol (ARP) mapper.

14. A method comprising:
sending, by a network controller, Address Resolution Protocol (ARP) configuration messages to provider edge nodes configured with ARP mappers, the ARP configuration messages including a media access control (MAC) address for a next hop node such that ARP requests received by the provider edge nodes route packets towards the next hop node, the next hop node accessible to one of the provider edge nodes, the next hop node being a Policy Enforcement point (PEP); and
monitoring, by the network controller, for PEP congestion and responsive to a PEP condition, sending the ARP configuration messages to the one of the provider edge nodes to update the one of the provider edge nodes' Address Resolution Protocol (ARP) mapper such that the one of the provider edge nodes will return a MAC address of a backup PEP to requesting nodes.

15. The method of claim 14 wherein the next hop node is accessible to the provider edge node via a layer 2 tunnel.

16. The method of claim 14 further comprising receiving, by the network controller, policy updates from the PEP, and responsive to the received policy updates, updating a provider edge node's Address Resolution Protocol (ARP) mapper.

17. The method of claim 14 wherein the provider edge nodes are configured to receive ARP table updates from the network controller.

18. The method of claim 14 wherein one of the provider edge nodes is a combined layer 3 router and layer 2 switch.

19. The method of claim 14 wherein one of the provider edge nodes is a configured as Internet protocol (IP) gateway.

20. The method of claim 14 wherein a network interface of one of the provider edge nodes is configured to access layer 2 tunnels, and the MAC address for the next hop node is accessible via a layer 2 tunnel.

* * * * *